United States Patent [19]
Weitner

[11] Patent Number: 5,915,740
[45] Date of Patent: *Jun. 29, 1999

[54] METHOD AND DEVICE FOR PLACING OR REMOVING VALVE-SPRING RETAINER LOCKS

[76] Inventor: Werner Weitner, Sollnau 12, Eichstätt, Germany, 85072

[*] Notice: This patent issued on a continued prosecution application filed under 37 CFR 1.53(d), and is subject to the twenty year patent term provisions of 35 U.S.C. 154(a)(2).

[21] Appl. No.: 08/697,676

[22] Filed: Aug. 28, 1996

[30] Foreign Application Priority Data

Jan. 19, 1996 [DE] Germany ............... 196 01 853

[51] Int. Cl.⁶ .................................................. B23P 19/04
[52] U.S. Cl. ............................ 29/213.1; 29/249
[58] Field of Search ............... 29/249, 282, 280, 29/275, 213.1, 214, 888.42, 215

[56] References Cited

U.S. PATENT DOCUMENTS

| | | |
|---|---|---|
| 2,517,583 | 7/1950 | Lunda . |
| 3,295,193 | 1/1967 | Maness . |
| 3,314,136 | 4/1967 | Giles ........................... 29/249 |
| 3,315,339 | 4/1967 | Young ......................... 29/249 |
| 3,316,623 | 5/1967 | Clark ........................... 29/249 |
| 3,564,697 | 2/1971 | Shalaty . |
| 3,793,999 | 2/1974 | Seiler et al. ................. 29/249 |
| 4,095,324 | 6/1978 | Lawson ....................... 29/249 |
| 5,207,196 | 5/1993 | Kuonen et al. . |
| 5,226,229 | 7/1993 | Pierce . |
| 5,241,734 | 9/1993 | Brackett . |

FOREIGN PATENT DOCUMENTS

| | | |
|---|---|---|
| 424320 | 10/1990 | European Pat. Off. . |
| 2909984 | 3/1988 | Germany . |
| 4002822 | 8/1990 | Germany . |
| 9416658.7G | 2/1995 | Germany . |

OTHER PUBLICATIONS

Publication No. 61014825 dated Jan. 23, 1986—Patent Abstracts of Japan.
Publication No. 63022231 dated Jan. 29, 1988—Patent Abstracts of Japan.
Publication No. 01257535 dated Apr. 30, 1988—Patent Abstracts of Japan.

Primary Examiner—Robert C. Watson
Attorney, Agent, or Firm—Collard & Roe, P.C.

[57] ABSTRACT

A device for replacing or removing valve-spring retainer locks includes a shaft, in which a sleeve is elastically supported. At its free end, the sleeve has wedge-like gap tools for detaching the valve-spring retainer locks and for holding the locks within a space of the shaft. A pin is elastically supported within the sleeve and provides for centering of the valve-spring retainer locks during replacement or removal.

9 Claims, 2 Drawing Sheets

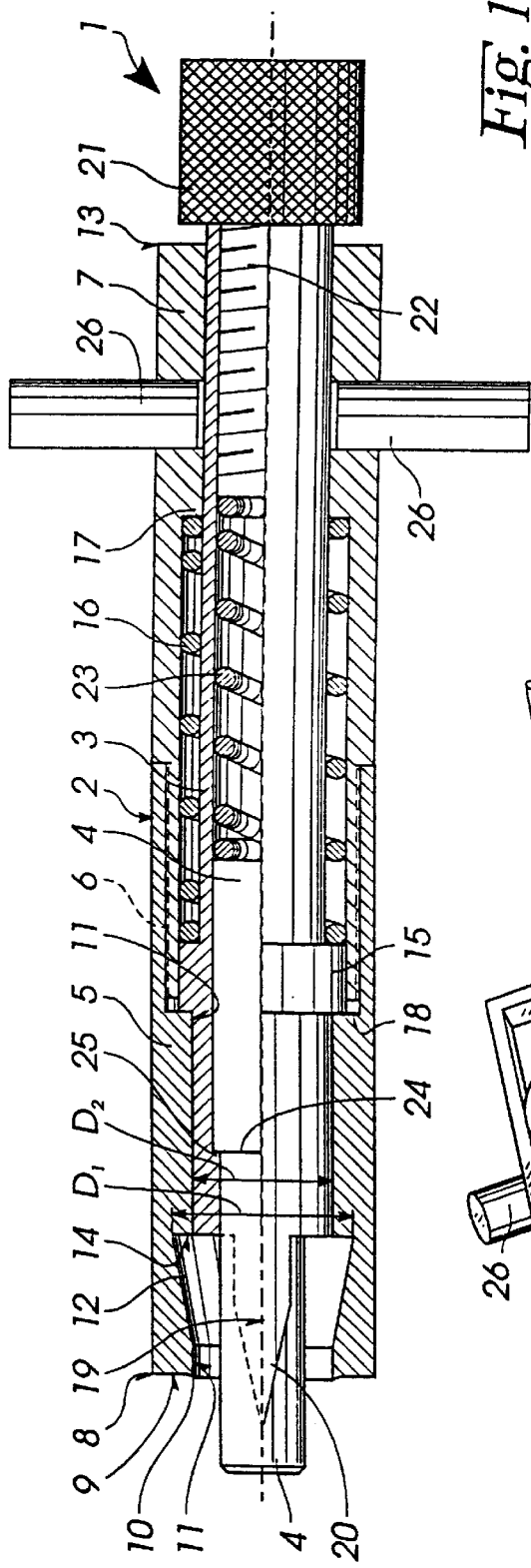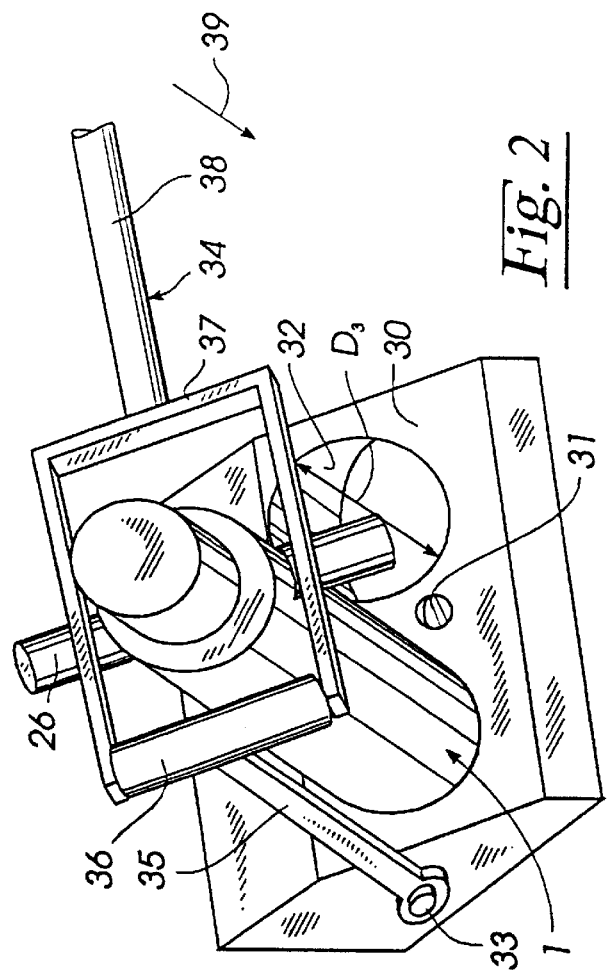

METHOD AND DEVICE FOR PLACING OR REMOVING VALVE-SPRING RETAINER LOCKS

BACKGROUND OF THE INVENTION

1. Field of the Invention

The present invention relates to a method and a device for replacing or removing valve spring retainer locks for affixing a spring cap on a valve tappet, for an internal combustion engine.

2. The Prior Art

DE 29 09 984 discloses a device which is formed by a shaft provided with an axial blind-end bore, and a thrust bolt, with the bolt being elastically supported on the shaft with axial displaceability. A centering pin is elastically supported within the shaft with axial displaceability. This known device, however, has the drawback that the valve-spring retainer locks have to be inserted in the spring cap before they can be mounted with the device. Such insertion of the valve-spring retainer locks, however, is difficult to accomplish, particularly because there is the risk that they will get lost due to a careless movement. Furthermore, this known device is not capable of removing the valve-spring retainer locks again. Consequently, it is unsuitable for the requirements in workshops, where for replacing the valve or the valve spring, the valve-spring retainer locks have to be removed first and then remounted again after the repair work has been completed.

DE 94 16 658.7G discloses a device for removing valve-spring retainer locks. It consists of a sleeve, which is covered on the underside by an elastic gripper disk. It is possible with this known device to push the spring cap of the valve back, whereby the valve-spring retainer locks drop into the space within the sleeve, from where they can be removed. However, this known device has the drawback that it cannot be used for replacing the valve-spring retainer locks. Furthermore, the valve-spring retainer locks cannot be removed if they adhere to the valve tappet or to the groove of the valve tappet. If this should happen, then there is, furthermore, the risk that the device may be detachable from the valve tappet only by applying forces so large as to be destructive.

SUMMARY OF THE INVENTION

It is an object of the present invention to provide a device and a method that permit the removal and the replacement of valve-spring retainer locks. The device is to be utilized in a simple way and can hold the removed valve-spring retainer locks until they are to be used again.

The above object is achieved according to the present invention by providing a method of placing valve-spring retainer locks on a valve tappet provided with a groove, for fixing a spring cap loaded by a valve spring, comprising the steps of inserting gap tools of a device between the valve-spring retainer locks; mounting said device on the face side of the spring cap and pressing against the spring force of the valve spring up to under the groove of the spring tappet; and releasing said valve-spring retainer locks by retraction of the gap tools, causing said locks to slide between the valve tappet and the spring cap, and said locks become wedged there upon retraction of the device.

The present invention also provides a method of removing valve-spring retainer locks from a valve tappet provided with a groove, said retainer locks securing a spring cap on said valve tappet, comprising placing a device on the face side of a spring cap and pressing against the spring force up to under the groove of the valve tappet; whereby gap tools simultaneously penetrate between the valve-spring retainer locks, detaching the locks from the valve tappet and subsequently holding the locks within the device.

The present invention is also directed to a device for placing and/or removing valve spring retainer locks securing a spring cap on a valve tappet for use in an internal combustion engine, comprising a shaft fitted with an axial bore, and a sleeve displaceably and elastically supported on the shaft, a pin being axially displaceably supported within the sleeve, and said sleeve being positively retractable in the shaft and has axially aligned, wedge-like gap tools at its free end, and that the shaft has a space tapering toward its end face for receiving the valve-spring retainer locks.

The method for placing or replacing valve-spring retainer locks according to the invention can be carried out in a very simple way, and, at the same time, in a very safe way. The valve-spring retainer locks to be replaced are inserted between gap tools of a device and held in the device, which means a complicated and, at the same time, time-consuming insertion of the valve-spring retainer locks in the spring cap by means of pincers is avoided. This is important particularly with modern internal combustion engines, which are equipped with an increasingly greater number of valves per cylinder, because the space available here for the replacement of the valve-spring retainer locks becomes increasingly more narrow.

Insertion of the valve-spring retainer locks in the device is particularly simple if such locks have been removed previously with the same device. This will be the usual procedure in ordinary workshop practice because a required repair of a valve involves the replacement of the valve or of the valve spring, whereby the valve-spring retainer locks can be reused. By means of the device, the spring cap is pushed under compression of the valve spring up to under the groove of the valve tappet, so that the valve-spring retainer locks are freed from their clamp seating between the groove of the valve tappet and the spring cap.

It is useful for these purposes to arrest the valve tappet in its position, so that it is not moved together with the spring cap. For this purpose, it would be possible to fill the interior space of the cylinder with compressed air. Alternatively, the valve could be retained also by a stop. The gap tools holding the valve-spring retainer locks are subsequently pulled back, whereupon the locks become freely movable and slide into the gap provided between the valve tappet and the spring cap. These measures make an exact adjustment of the valve-spring retainer locks superfluous, which would be particularly difficult under the confined space conditions of an internal combustion engine especially with multi-valve technology. As the device is finally pulled back, the spring cap together with the retainer locks slides along the valve tappet until the locks engage the groove of the valve tappet and get wedged therein.

In another embodiment of the method for the removal of valve-spring retainer locks according to the invention, the device is again first placed on the spring cap and pushed up to under the groove of the valve tappet. Since the valve tappet is maintained in its position, for example by excess pressure in the cylinder space or by a mechanical stop, the spring cap becomes detached from the valve-spring retainer locks.

As the device is being pushed, gap tools simultaneously penetrate the gaps between the valve-spring retainer locks and spread the locks apart. It is assured in this way that the gap locks become detached from the valve tappet even if they are stuck fast in the valve tappet groove. This could have been caused, for example if oil has penetrated the valve tappet groove and begins to form solids due to the high operating temperatures of the valve, especially within the zone of the exhaust. Application of force by the gap tools provides under such unfavorable conditions for a safe removal of the valve-spring retainer locks from the valve tappet groove. Subsequently, the valve-spring retainer locks are deposited and kept within the device. Preferably, the gap tools themselves serve for holding the valve-spring retainer locks, so that the locks can be very easily reinserted again with application of the method according to the invention.

In another embodiment, it is desirable to place a pin on the valve tappet before mounting the device. This pin preferably has a diameter corresponding to the diameter of the valve tappet. Both during replacement and removal of the valve-spring retainer locks, this pin prevents the valve-spring retainer locks from dropping inwardly and from no longer being sufficiently safely held by the gap tools. This, however, is required only in cases in which the gaps between the valve-spring retainer locks have relatively large dimensions, so that the valve-spring retainer locks do not mutually keep each other adequately spaced from the axis of the valve tappet. The pin is preferably elastically placed on the valve tappet, so that it always sits safely on the valve tappet when the valve-spring retainer locks are put into place or removed, and secures the retainer locks in their position. This also assures that the pin loses its contact with the valve tappet only after the device has been pulled back from the spring cap.

In general, the valve-spring retainer locks are not disposed in the valve tappet groove in any defined radial angular position. Therefore, the gap tools have to be aligned with the position of the valve-spring retainer locks when the locks are removed. This could be accomplished, for example by rotating the device around its longitudinal axis. It is simpler if, according to a further embodiment, only the gap tools are rotated into a position in which they engage the gaps between the valve-spring retainer locks. The device is acted upon by a relatively high force because such force has to be in equilibrium with the valve spring. On the other hand, a relatively lower force acts on the gap tools, so that the gap tools can be rotated with significantly less friction and thus in a more delicate way. Rotating is thus possible by hand without any complicated support of the device, so that the correct position of the gap tools can be simply made out by touch, i.e., by feeling the gap tools locking into the gaps between the valve-spring retainer locks.

The device of the invention is capable of carrying out the method of the invention. The device has a sleeve with wedge-like gap tools, with which the valve-spring retainer locks can be separated from the shaft. The valve-spring retainer locks, once removed, are deposited in a space for which provision is made in the shaft, such space tapering toward the end face. Since the valve-spring retainer locks, once removed, each are present between the wedge-like gap tools, they are forced radially outwardly by the gap tools, whereby the valve-spring retainer locks rest against a limit surface of a spaced provided in the shaft, such space tapering toward the end face. Due to said special shape of the space, in which the valve-spring retainer locks are deposited, the valve-spring retainer locks are prevented from sliding downwardly up to the opening of the space, and that they can drop out of the device in this way. Since the sleeve with the gap tools mounted thereon is elastically supported by the shaft, the gap tools are loaded under the force of the spring in the direction of the end surface of the device, so that the valve-spring retainer locks are safely held in the space of the shaft. The sleeve is designed for positive retraction, so that the containment of the valve-spring retainer locks within the device can be ended. By retracting the sleeve and thus the gap tools, the valve-spring retainer locks are released, so that they slide along the inside surface of the space tapering toward the end surface of the shaft. In addition, the valve-spring retainer locks are guided on the inside by a pin; and this pin is aligned with the valve tappet and preferably having the same diameter as the latter. In this way, the valve-spring retainer locks, when exiting from the space of the shaft, are correctly held in their positions both on the inside and outside, and are thus safely received in the annular gap provided between the valve tappet and the spring cap.

Retractability of the sleeve into the shaft could be realized, for example by a pin projecting on the outside beyond the sleeve, such pin penetrating a slot of the shaft. Alternatively, it would be possible also to magnetically transmit a pushing force. However, it is most useful if, according to a further embodiment, the shaft is fitted with an axial through-extending bore, the latter receiving the sleeve. At the opposite end of the shaft, the end is disposed opposite the end surface and provision is made for a handle in the form of a grip part, with the help of which the sleeve is retractable. This results in a particularly simple and thus clear structure of the device whereby the device can be operated in a very easy manner.

So that the gap tools can be turned into a position in which they engage the gaps between the valve-spring retainer locks, the sleeve, according to another embodiment is rotatably supported in the shaft. In a further embodiment, the manipulation is particularly simple especially if the same handle be used for both turning and retracting the gap tools.

According to another embodiment it is advantageous that the wedge-like gap tools are shaped by being molded onto the sleeve, forming one piece with the sleeve. The gap tools are highly stressable in this case without the risk of a gap wedge being broken off. Thus the gap wedges can be very slim, which enhances their splitting capability.

According to a further embodiment, it is desirable that the pin supported in the sleeve be acted upon by a spring. In this connection, the pin is forced by the spring into a position in which it projects beyond the sleeve. This assures that when the device is placed on the spring cap of a valve, the central pin already rests against the valve tappet and remains in contact with the valve tappet until the device is removed again from the spring cap. Therefore, the pin and the valve tappet jointly form a type of safety device securing the position of the valve-spring retainer locks. In this way, the valve-spring retainer locks are prevented from moving toward the axis of the sleeve, in which case they could no longer be correctly seized and held by the gap tools.

According to another embodiment, it is desirable to have the space for receiving the valve-spring retainer locks in the form of a truncated cone. This results in a particularly favorable attachment of the valve-spring retainer locks to the inside wall of the shaft, since the locks have a conical shape on the outside, so that the locks are very safely supported within the shaft. Since the maximum diameter of this space is greater than the diameter of the axial bore, an undercut is obtained, which prevents the valve-spring retainer locks from being moved toward the counter end of the shaft and thus from assuming an undefined position within the shaft.

According to a further embodiment, it is advantageous to guide the shaft in a through-extending bore of a mount that can be positioned on the internal combustion engine. It is assured in this way that the shaft is moved axially relative to the valve tappet irrespective of the direction of the applied force. The shaft and the pin consequently always remain centered on the spring cap and, respectively, valve tappet, so that a trouble-free replacement or removal of the valve-spring retainer locks is assured. In addition, the mount provided with a through-extending bore offers the special advantage that the through extending bore offers the special advantage that the through-extending bore is exactly adapted to the given internal combustion engine with respect to its position and direction, so that no adjustments of the mount are required. Replacement of the valve-spring retainer locks, therefore, can be carried out in a particularly simple and rapid way and at favorable cost.

Finally, according to another embodiment, it is desirable to provide the shaft with an abutment for a tool. In this case, the tool engages the abutment, for which provision is made on the mount. This means that the force of pressure required to be applied to the shaft for overcoming the force of the valve spring can be applied in a particularly easy way by the lever effect of the tool. The abutment provided on the shaft could be realized, for example in the form of radially projecting bolts, or in the form of grooves on the counter end of the shaft.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing, wherein similar reference characters denote similar elements throughout the several views:

FIG. 1 shows a partial sectional view of a device for placing and removing -spring retainer locks;

FIG. 2 shows a perspective view of the device according to FIG. 1 with a mount and a lever;

DETAILED DESCRIPTION OF PREFERRED EMBODIMENTS

Figure 3:
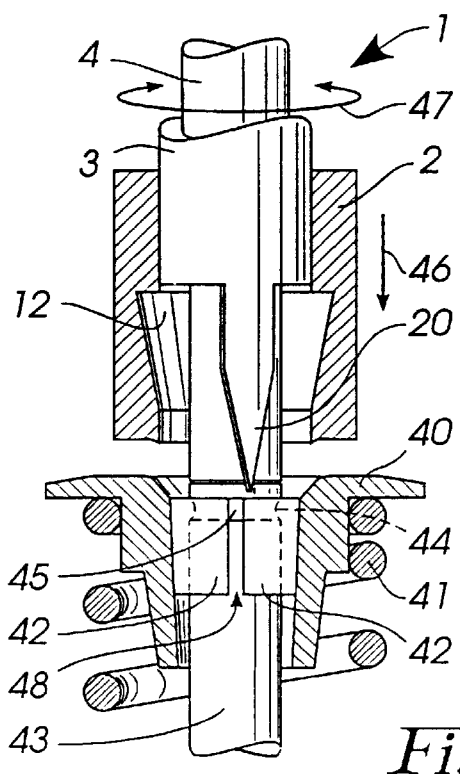
FIG. 3 shows the device according to FIG. 1 as it is being placed on a spring cap.

Turning now in detail to the drawings, FIG. 1 shows a device 1 for placing or removing valve-spring retainer locks (not shown) comprising a shaft 2 shown in a sectional view, a sleeve 3 axially displaceable within the shaft, and a pin 4 which is supported in the sleeve. The shaft 2 includes a head part 5, which is connected with a housing part 7 by means of a thread 6. At its free end 8, the head part 5 has an end face 9 for resting against a spring cap (not shown). In the end face 9, provision is made for a centering bead 10, which surrounds an axial through-extending bore 11 of the shaft 2. This centering bead 10 permits self-centering of the device 1 on the spring cap.

In the head part 5 of the shaft 2, provision is made for a space 12, which space 12 is slightly spaced from the end face 9 of the head part and widening in the form of a truncated cone toward the counter end 13. This space 12 serves for depositing the valve-spring retainer locks. The space 12 has a maximum diameter $D_1$, which is greater than the diameter $D_2$ of the through-extending bore 11. The result thereof is that the space 12 is limited toward the counter end 13 within the zone of the outer edge by a radial surface 14. The surface 14 serves as a stop surface for the valve-spring retainer locks, so that these locks cannot get beyond the space 12 deeper into the shaft 2.

The sleeve 3 supported in the shaft 2 is shown by a sectional view in its top half, and schematically in its lower half of FIG. 1. It has a reinforcement 15 on its outer side, which, on the one hand, serves as a stop against the head part 5, and also serves as an abutment for a pressure spring 16, on the other hand. The pressure spring 16 is supported on the shaft 2 on an abutment 17 and presses the sleeve 3 in the direction of the end face 9 of the shaft 5 until the reinforcement 15 rests against a cross sectional reduction 18 of the head part 5. Wedge-like or wedge-shaped gap tools 20 are shaped by being molded onto the sleeve 3 at its free end 19, forming one piece with the sleeve; and the gap tools are axially aligned with the shaft 2.

The gap tools serve for separating the valve-spring retainer locks from the valve tappet and for holding the locks in the space 12. Within the range of the counter end 13, the sleeve 3 penetrates the axial through-extending bore 11 of the shaft 2. So that the sleeve 3 can be positively retracted within the shaft and simultaneously turned, a handle 21 in the form of a knurled gripping part is screwed into the sleeve 3 at the counter end 13. A threaded bolt 22 of the handle 21 serves at the same time as an abutment for a spring 23 supported in the sleeve 3. The pin 4 supported with axial displaceability in the sleeve 3 is pressed by the spring 23 in the direction of the end face 9. In order to limit the extent of displacement of the pin 4, the pin 4 has a step 24 cooperating with an inside stop 25 of the sleeve 3.

On the housing part 7 of the shaft 2, provision is made for the handles, or abutments, 26 projecting to the outside, and these handles or abutments, have the form of two radially directed bolts aligned with one another. The handle abutments 26 serve for being engaged by a tool, with the help of which the device 1 is pressed against the force of the valve spring.

FIG. 2 shows a perspective view of the device 1 according to FIG. 1. A mount 30 is held by means of the mounting screws 31 on a motor block not shown. The mount 30 is designed in the form of a block-like body and has the through-extending bores 32, which are aligned with respect to their positions and directions with the valve tappets of the engine located beneath. The through-extending bores 32 have the diameters $D_3$, which assure axial displaceability and at the same time guidance for the device 1. The number of through-extending bores 32 only depends on practical considerations. For example, provision may be made for only one single through-extending bore, with which one single valve can be replaced. Alternatively, it is possible to provide a plurality of through-extending holes 32, so that a plurality of valves can be quickly replaced.

An abutment 33 is present on the mount 30, with the abutment being engaged by a tool 34 for pushing the device 1. The tool 34 includes a bridge 35, on which a fork 37 is articulated via a pivot joint 36. Opposite the pivot joint 36, a lever arm 38 is fixed on the fork 37, the opposite end (not shown) of the lever arm being fitted with a handle. By pushing the lever arm 38 in the direction of arrow 39, the fork 37 applies to the abutments 26 of the device 1 an axially directed force, which presses the device 1 against the spring cap. A translation of force is realized through the long lever arm 38, so that a relatively low expenditure of force has to be applied for pressing the valve spring.

The method of the invention for placing valve-spring retainer locks is explained in greater detail by reference to FIGS. 3 to 6. FIG. 3 shows the device 1 with its shaft 2, its sleeve 3 with the gap tools 20 and the pin 4 as it is placed on a spring cap 40, and cap 40 is loaded by a valve spring 41. The spring cap 40 is fixed on a valve tappet 43 by means of the two valve-spring retainer locks 42. For this purpose, the valve-spring retainer locks have an outside cone shape adapted to the spring cap 40, and, on the inside, have a bead 44, with the bead penetrating a radial groove 45 of the valve tappet 43.

When the device 1 is placed on the spring cap 40, first the pin 4 comes to rest against the valve tappet 43 because the pin projects beyond the shaft 2. The device 1 is first pressed against the spring cap 40 in the direction of the arrow 46, whereby the elastically supported pin 4 is forced back into the sleeve 3. By pressing the device 1 in the direction of arrow 46, the wedge-shaped gap tools 20 come to rest against the valve-spring retainer locks 42, and are also forced back into the shaft 2 as the shaft is being displaced further. Subsequently, the sleeve 3 is turned by means of its handle 21 in the direction of arrow 47 until the gap tools 20 engage the gaps 48 between the valve-spring retainer locks 42. Such engagement can be very easily felt by the operator by a clearly noticeable snap-in of the sleeve 3, because the resistance of sleeve 3 to rotation is then clearly increased.

After the gap tools 20 have been snapped into position in the gaps 48, the device 1 is now pushed further in the direction of arrow 46, so that the spring cap 40 is displaced in the direction of arrow 46 against the force of the valve spring. At the same time, the gap tools 20 penetrate deeper into the gaps 48 between the valve-spring retainer locks 42 and force the latter apart. The retainer locks are detached in this way from the valve tappet 43 and are freely movable. Should the valve-spring retainer locks 42 stick very solidly to the groove 45 of the valve tappet 43, the force applied by the spring 16 to the sleeve 3 may not suffice for separating the valve-spring retainer locks. In such a case, however, the splitting force of the gap tool 20 can be increased by pressing the handle 21 of the sleeve 3, so that the valve-spring retainer locks 42 are safely separated from the valve tappet 43.

Figure 5:
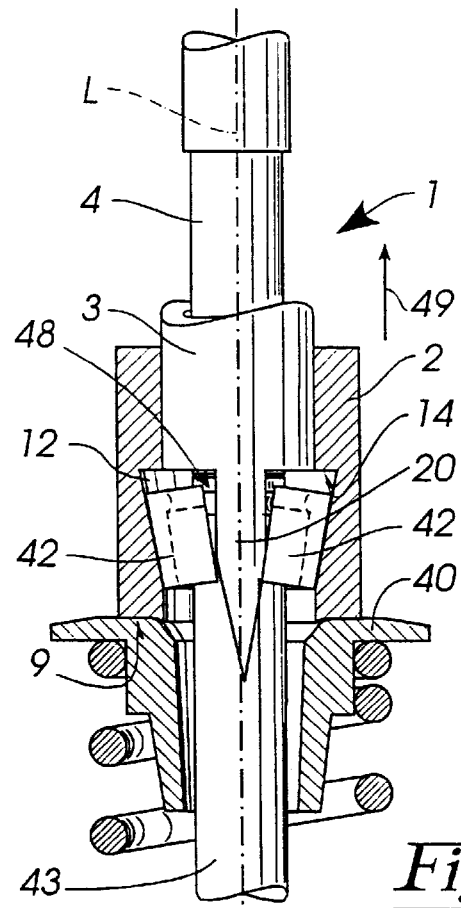
FIG. 5 shows the device according to FIG. 3 after the removal of the valve retainer locks.

After the shaft 2 has been pressed into the valve tappet groove 45, the valve-spring retainer locks are freed and are received in the space 12 of the shaft 2 as shown in FIG. 5. The space 12 is designed conically tapering toward the end face 8 of the shaft 2. In this way, it is assured that when the sleeve 3 is in the position shown in FIG. 5, the valve-spring retainer locks 42 are radially pushed outwardly by the gap tools 20, so that they are safely held in the space 12. The holding safety of the retainer locks 42 is increased further by the pin 4, which prevents the retainer locks from dropping inwardly. Thereafter, the shaft 1 can be displaced in the direction of arrow 49 as the valve spring 41 is being relieved, and it can be removed from the spring cap 40, so that it reaches the end position shown in FIG. 6. The valve-spring retainer locks 42 are then removed together with the device 1, so that the necessary repairs can be carried out on the valve.

FIG. 5 also shows that sleeve 3 has a longitudinal axis L, and that the wedges of the gap tools 20 are axially aligned parallel to the longitudinal axis L. The wedges engage the gaps 48 with the gaps 48 also being axially aligned parallel to the longitudinal axis L as also shown in FIG. 4.

Figure 6:
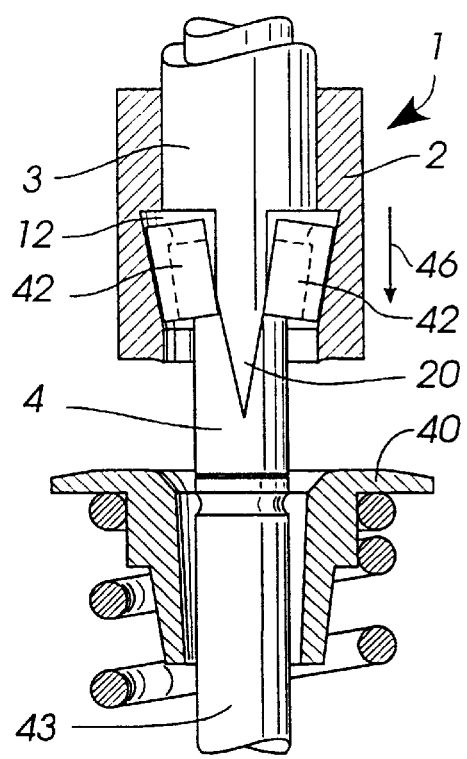
FIG. 6 shows the device according to FIG. 3 as it is being removed from the spring cap.

In order to insert the valve-spring retainer locks 42 again between the valve tappet 43 and the spring cap 40 after the repair has been completed, the device 1 according to FIG. 6 with the inserted valve-spring retainer locks 42 is placed again on the spring cap 40 and pushed in the direction of arrow 46 until it reaches the position shown in FIG. 5. Subsequently, the sleeve 3 is retracted in the direction of arrow 49 by pulling on its handle 21, so that the valve-spring retainer locks 42 become freely movable in the space 12. The valve-spring retainer locks 42 are guided on the inside by the pin 4, whose diameter corresponds with the diameter of the valve tappet 43, and on the outside by the conicity of the space 12. In this way, it is assured that the valve-spring retainer locks 42 slide into their predetermined position between the spring cap 40 and the valve tappet 43. Subsequently, the shaft 2 is displaced in the direction of arrow 49 as the valve spring 41 is being partly relieved, whereby the valve-spring retainer locks 42 slide along the valve tappet.

Figure 4:
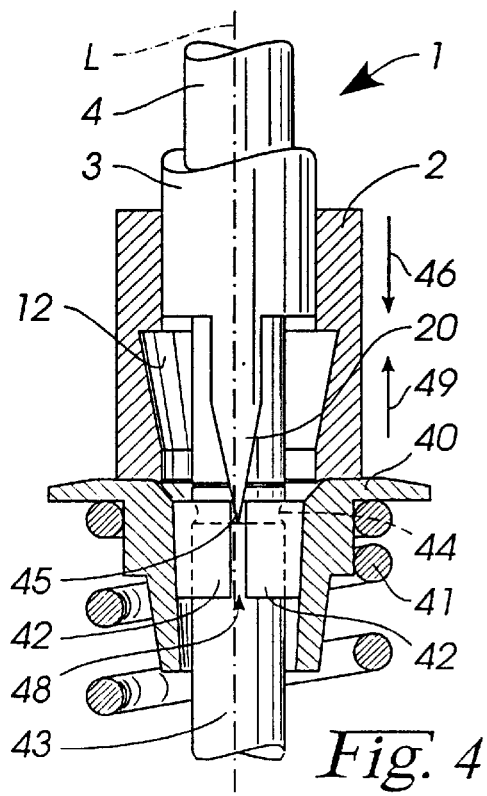
FIG. 4 shows the device according to FIG. 3 as the gap tools penetrate between the valve-spring retainer locks.

As shown in FIG. 4, as soon as the beads 44 of the valve-spring retainer locks 42 are aligned with the radial groove 45 of the valve tappet 43, the valve-spring retainer locks 42 become wedged between the valve tappet 43 and the spring cap 40. This causes the spring cap 40 to be fixed on the spring tappet 43, so that when the shaft 2 is displaced further in the direction of arrow 49, the spring cap 40 remains in its position, and the device 1 can be removed.

While several embodiments of the present invention have been shown and described, it is to be understood that many changes and modifications may be made thereunto without departing from the spirit and scope of the invention as defined in the appended claims.

What is claimed is:

1. Device for replacing and removing valve spring retainer locks securing a spring cap on a valve tappet for use in an internal combustion engine, comprising a shaft having an axial bore, and a sleeve displaceably and elastically supported in said shaft;

said sleeve being positively retractable within the shaft and having axially aligned, gap tools at a free end of the shaft;

said gap tools containing wedges being axially aligned with the shaft and said wedges engaging the gaps between the valve-spring retainer locks; and said shaft has a space tapering toward an end face of the shaft for receiving the valve-spring retainer locks.

2. Device according to claim 1, wherein the axial bore of the shaft is a through-extending bore, said through-extending bore being penetrated by the sleeve; and at a counter end of the shaft, the sleeve has a handle projecting beyond the shaft.

3. Device according to claim 1, comprising means for rotatably supporting the sleeve in the shaft.

4. Device according to claim 1, wherein the wedge-like gap tools are shaped by molding onto the sleeve, forming one piece with the sleeve.

5. Device according to claim 1, comprising a spring; and a pin being axially displaceably supported within said sleeve. and wherein the pin supported in the sleeve is pressed by means of said spring into a position in which it projects beyond the sleeve.

6. Device according to claim 1, wherein the shaft has a space for receiving the valve-spring retainer locks; said space having the shape of a truncated cone, whose maximum diameter ($D_1$) is greater than a diameter of the axial bore.

7. Device according to claim 1, further comprising a mount; and wherein the shaft is axially displaceably guided in a through-extending bore of said mount which is lockable on an internal combustion engine, said bore being aligned with the valve tappet.

8. Device according to claim 1, comprising a mount;

a handle on the shaft for use with a tool; and the tool engaging an abutment provided on said mount.

9. Device for replacing and removing valve spring retainer locks securing a spring cap on a valve tappet for use in an internal combustion engine, comprising a shaft having an axial bore, and a sleeve displaceably and elasticlly supported in said shaft; said sleeve having a longitudinal axis;

said sleeve being positively retractable within the shaft and having axially aligned gap tools at a free end of the shaft;

said gap tools containing wedges being axially aligned with the shaft parallel to said longitudinal axis and said wedges engaging gaps between the valve-spring retainer locks; and said gaps being axially aligned parallel to said longitudinal axis; and said shaft has a space tapering toward an end face of the shaft for receiving the valve-spring retainer locks.

* * * * *